(12) United States Patent
Rieschl et al.

(10) Patent No.: US 9,026,553 B2
(45) Date of Patent: May 5, 2015

(54) DATA EXPANSE VIEWER FOR DATABASE SYSTEMS

(71) Applicant: Unisys Corporation, Blue Bell, PA (US)

(72) Inventors: Michael Rieschl, Roseville, MN (US); James Merten, Roseville, MN (US); Matthew Trautman, Roseville, MN (US); John Loberg, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 8 days.

(21) Appl. No.: 13/688,896

(22) Filed: Nov. 29, 2012

(65) Prior Publication Data

US 2014/0149459 A1    May 29, 2014

(51) Int. Cl.
*G06F 17/30* (2006.01)

(52) U.S. Cl.
CPC .... *G06F 17/30492* (2013.01); *G06F 17/30091* (2013.01)

(58) Field of Classification Search
CPC .......... G06F 17/3056; G06F 17/30415; G06F 17/30418; G06F 17/30595; G06F 17/30893; G06F 17/30566; G06F 21/00; G06F 17/30002; G06F 17/30572; G06F 17/30433; G06F 17/30477; G06F 2201/815; G06F 17/30091; G06F 11/00; G06F 9/4401
USPC .......... 707/797, 803, 702, E17.005, E17.032, 707/E17.044, 776, 781, 773, 770, 769, 758, 707/692, 737, 802, E17.014, 639; 717/101, 717/138, 116, 143, 136, 139, 122, 158, 717/203; 709/221, 223, 246; 711/101, 138, 711/116, 143, 161, 162, 142, 152, 171; 719/328
See application file for complete search history.

(56) References Cited

U.S. PATENT DOCUMENTS

| | | | | |
|---|---|---|---|---|
| 5,448,726 | A * | 9/1995 | Cramsie et al. | 707/E17.005 |
| 5,732,404 | A * | 3/1998 | Johnson et al. | 711/2 |
| 5,754,772 | A * | 5/1998 | Leaf | 709/203 |
| 5,754,845 | A * | 5/1998 | White | 707/702 |
| 5,835,963 | A * | 11/1998 | Yoshioka et al. | 711/207 |
| 6,115,771 | A * | 9/2000 | Born | 710/315 |
| 6,178,519 | B1 * | 1/2001 | Tucker | 714/4.4 |

(Continued)

OTHER PUBLICATIONS

E Stolte, G Alonso—"Optimizing scientific databases for client side data processing" Advances in Database Technology—EDBT 2002,—2002—Springer—LNCS 2287—pp. 390-408.*

(Continued)

*Primary Examiner* — Anh Ly
(74) *Attorney, Agent, or Firm* — Richard J. Gregson (57) ABSTRACT

Systems and methods for obtaining access to a database file managed by an operating system in a computing system are disclosed. One method includes transmitting a call to an operating system from a database management system, the call requesting access to a database file. The method also includes receiving an address from the operating system at the database management system. The address represents a general address of the database file managed by the operating system. The method further includes transmitting a call to the operating system from the database management system, which includes an address and a size of a view of the database file to be created. The method also includes receiving an address of the view of the database file from the operating system.

16 Claims, 7 Drawing Sheets

(56) References Cited

U.S. PATENT DOCUMENTS

| | | | |
|---|---|---|---|
| 6,308,202 B1* | 10/2001 | Cohn et al. | 709/217 |
| 6,324,683 B1* | 11/2001 | Fuh et al. | 717/124 |
| 6,606,652 B1* | 8/2003 | Cohn et al. | 709/217 |
| 6,901,403 B1* | 5/2005 | Bata et al. | 707/E17.032 |
| 7,065,676 B1* | 6/2006 | Lang et al. | 714/33 |
| 7,158,967 B1* | 1/2007 | Turba et al. | 707/E17.117 |
| 7,305,404 B2* | 12/2007 | Owens et al. | 707/776 |
| 7,792,378 B2* | 9/2010 | Liege et al. | 382/254 |
| 7,805,706 B1* | 9/2010 | Ly et al. | 717/121 |
| 7,912,854 B2* | 3/2011 | Owens et al. | 707/776 |
| 8,150,808 B2* | 4/2012 | Zha et al. | 707/639 |
| 8,151,004 B1* | 4/2012 | Ufimtsev et al. | 709/246 |
| 2002/0049903 A1* | 4/2002 | Ussery et al. | 713/165 |
| 2002/0116213 A1* | 8/2002 | Kavounis et al. | 705/1 |
| 2003/0058277 A1* | 3/2003 | Bowman-Amuah | 345/765 |
| 2003/0172304 A1* | 9/2003 | Henry et al. | 713/201 |
| 2004/0083465 A1* | 4/2004 | Zhang et al. | 717/143 |
| 2004/0090472 A1* | 5/2004 | Risch et al. | 345/853 |
| 2004/0181543 A1* | 9/2004 | Wu et al. | 707/102 |
| 2006/0004885 A1* | 1/2006 | Lubashev et al. | 707/203 |
| 2006/0031187 A1* | 2/2006 | Pyrce et al. | 719/328 |
| 2006/0076397 A1* | 4/2006 | Langos | 235/375 |
| 2006/0122964 A1* | 6/2006 | Yu et al. | 707/2 |
| 2006/0206485 A1* | 9/2006 | Rubin et al. | 707/9 |
| 2006/0224628 A1* | 10/2006 | Gupta | 707/104.1 |
| 2007/0130231 A1* | 6/2007 | Brown et al. | 707/204 |
| 2007/0271570 A1* | 11/2007 | Brown et al. | 718/105 |
| 2008/0027980 A1* | 1/2008 | Owens et al. | 707/103 R |
| 2008/0177994 A1* | 7/2008 | Mayer | 707/E17.014 |
| 2008/0222397 A1* | 9/2008 | Wilkerson et al. | 712/220 |
| 2009/0254774 A1* | 10/2009 | Chamdani et al. | 714/2 |
| 2009/0276205 A1* | 11/2009 | Jennings et al. | 703/26 |
| 2009/0313503 A1* | 12/2009 | Atluri et al. | 714/19 |
| 2010/0318637 A1* | 12/2010 | Ly et al. | 709/221 |
| 2011/0093435 A1* | 4/2011 | Zha et al. | 707/639 |
| 2011/0138123 A1* | 6/2011 | Gurajada et al. | 711/118 |
| 2011/0153938 A1* | 6/2011 | Verzunov et al. | 711/118 |
| 2012/0089570 A1* | 4/2012 | Zha et al. | 707/639 |
| 2012/0151184 A1* | 6/2012 | Wilkerson et al. | 712/36 |
| 2013/0047089 A1* | 2/2013 | Kulathungam | 715/739 |
| 2013/0297800 A1* | 11/2013 | Considine et al. | 709/226 |
| 2014/0173268 A1* | 6/2014 | Hashimoto | 713/2 |

OTHER PUBLICATIONS

D Weyns, A Helleboogh, T Holvoet—"The packet-world: A test bed for investigating situated multi-agent systems" Software Agent-Based Applications—from kuleuven,—2005—Springer—pp. 1-26.*

* cited by examiner

DATA EXPANSE VIEWER FOR DATABASE SYSTEMS

TECHNICAL FIELD

The present application relates generally to database systems. In particular, the present application relates to a data expanse viewer for a database system

BACKGROUND

Database management systems traditionally provide for managing data in a particular database, and managing access to that data by many different user programs. These users programs are written in a high level language, such as C, C++, Java, or some other analogous language. The user program typically performs a call of the database management system when a database operation is to be performed.

Figure 1:
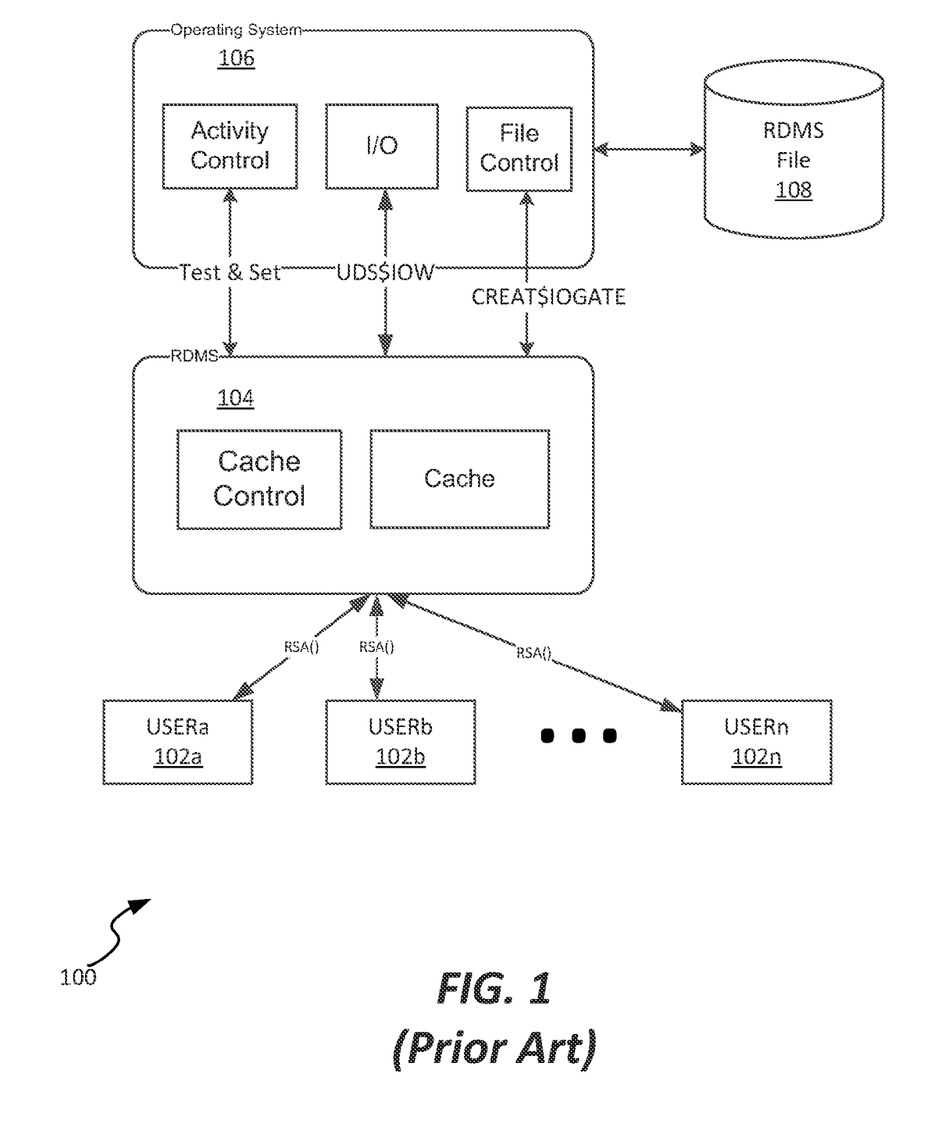
FIG. 1 is a schematic view of a prior art arrangement of a computing system including a database management system.

When a database management system receives the request, it typically handles that request as depicted in FIG. 1. As illustrated in that FIG., a system 100 includes a plurality of user applications 102a-n, from one or more of which a query statement can be is received by a database management system 104. If the database management system 104 is a relational database management system the query statement can be, for example, a SQL statement. The database management system 104 analyzes the query statement to determine if there are any errors in the statement itself. Assuming that there are no errors, the database management system 104 will transmit a call to an operating system 106 hosting that system (shown as CREAT$IOGATE), requesting access to the database file 108. The operating system 106 will then assign the database file to the database management system 104. The database management system 104 then caches at least portions of the database file using subsequent system calls (e.g., UDS$IOW). This requested data is modified by the database management system 104, and control is returned to the user program for continued execution.

This arrangement has drawbacks. For example, this arrangement requires caching of data in the database management system 104, which requires the database management system to manage data control using locks and test & set operations on the underlying data file. Beyond this cache control requirement, the database management system 104 is required to address various portions of the database file 108 as required to access data managed by the database. This can become problematic when database files increase in size to the extent that the database file has a size greater than the addressable range of the database management system. In such situations, the database management system 104 traditionally would be limited such that each database file could only be of a limited size, or at the very least the user application 102 would be limited to addressing a particular range of addresses. As data sizes continue to increase, this limitation in the database management system will only become an increasingly problematic issue.

For these and other reasons, improvements are desirable.

SUMMARY

In accordance with the following disclosure, the above and other issues are addressed by the following:

In a first aspect, a method of obtaining access to a database file managed by an operating system in a computing system is disclosed. The method includes transmitting a call to an operating system from a database management system, the call requesting access to a database file. The method also includes receiving an address from the operating system at the database management system. The address represents a general address of the database file managed by the operating system. The method further includes transmitting a call to the operating system from the database management system, which includes an address and a size of a view of the database file to be created. The method also includes receiving an address of the view of the database file from the operating system.

In a second aspect, a method of providing access to a database file by an operating system in a computing system is disclosed. The method includes receiving a call from a database management system, thereby requesting access to a database file. The method also includes transmitting an address to the database management system representing a general address of the database file managed by the operating system. The method further includes receiving a call from the database management system including an address and a size of a view of the database file to be created. The method includes generating a view of the database file based on the call, and transmitting an address of the view of the database file from the operating system.

In a third aspect, a system includes a computing system including a processor and memory. The system also includes an operating system and a database management system. The operating system is maintained in the memory and configured to manage a file system maintained in the memory, the file system maintaining a database file having a file size. The database management system is hosted by the operating system, and supports an address range that is smaller than the file size. The operating system is configured to, in response to a call requesting access to the database file, transmit a general address of the database file to the database management system, and in response to a call requesting a view of the database file, transmit an address of the view of the database file.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for providing access to data to a database management system, where the database management system is hosted by an operating system, and in which the operating system provides access to a data file for the database management system. In particular, the present disclosure relates to providing a data expanse viewer at an interface between a database management system and an operating system. The data expanse viewer allows a database management system that can only address less than all of an entire range of a database file to selectively view portions of that file. This allows an operating system to host database files of various sizes, including sizes greater than those supported by addressable ranges of a hosted database management system. Furthermore, the present disclosure provides a data expanse viewer that allows a database management system to avoid being required to cache database files, thereby avoiding many types of test & set operations that otherwise would lock control of the data file for use by other applications.

Figure 2:
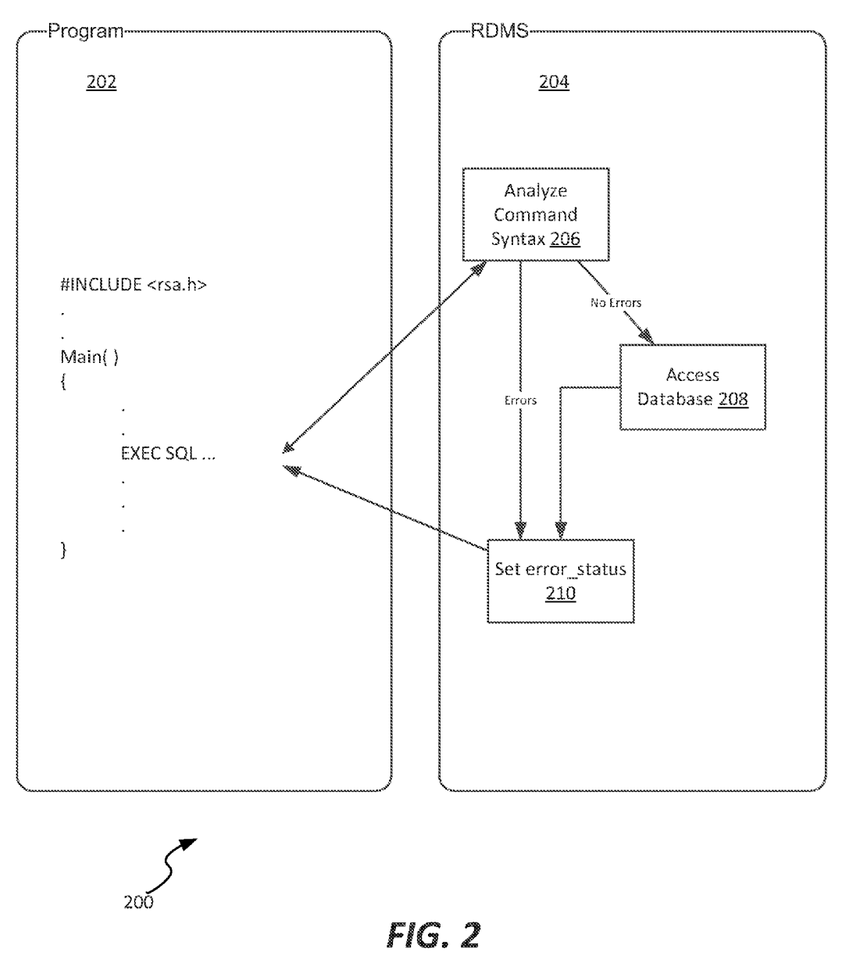
FIG. 2 is a schematic view illustrating a user application interface to a database management system, as can be used to implement aspects of the present disclosure.

Referring now to FIG. 2, a schematic view illustrating a user application interface 200 to a database management system is shown that can be used to implement aspects of the present disclosure. In the embodiment shown, a user application 202 includes code, which can be written, for example, in C (as shown), or any of a variety of other types of programming languages, such as C++, Java, or other languages. The user application 202 generally includes a call to a database management program 204 within the code of the application, to effect access to a database, e.g., to read or edit data in the database managed by the database management program 204. In the example embodiment shown, the user application 202 includes a line of code in the C programming language indicated as "EXEC SQL . . . " which represents a form of a line of code useable to call the database management program 204. In various embodiments, the user application 202 can be any of a variety of user applications useable to access and/or modify data in a database.

The database management program 204 can be any program implementing a database management system that is hosted by an underlying operating system. In an example embodiment, the database management program corresponds to a relational database management system, such as the RDMS database management system available from Unisys Corporation of Blue Bell, Pa.; however, in alternative embodiments, other types of database management systems, and other arrangements of databases, could be used as well.

In the embodiment shown, the database management program 204 includes a syntax analyzer component 206, an access component 208, and an error status component 210. The components 206-210 are generally used to access and validate access requests to data on behalf of the user application 202 by the database management program 204. The syntax analyzer component 206 receives a database command from the user application 202, such as a SQL command, or other database command that will allow the application program to add, delete, insert, and update data in a database.

The syntax analyzer component 206 determines an operation to be performed based on parsing the received command.

If no errors are detected in the command, the access component 208 interfaces with an underlying operating system to access a file containing data associated with the database accessed by the user application 202, for parsing and use by the database management program 204. The access component 208 can then execute the database command as defined in the received command. In such a case, an error status component 210 is set to indicate that no error has occurred in completion of the database operation. However, if an error is detected in the syntax analyzer component 206, or during performance of the command by the access component 208, error status component 210 indicates that an error exists in the received database command. Accordingly, either a confirmation of the properly executed database command, or an indication of an error, can be returned from the error status component 210 to the user application 202.

It is noted that, beyond passage of particular database commands from the user application 202, it is also possible for the database management program 204 to allow use of placeholder variables in a command string, and therefore transfer values from program variables in the C code of the program to the database, or from the database to program variables in the C code, thereby integrating the database as a mechanism for storage of large program constructs, such as variables of large size, variable classes, and other data structures used as variables and for which storage in a database is convenient.

Figure 3:
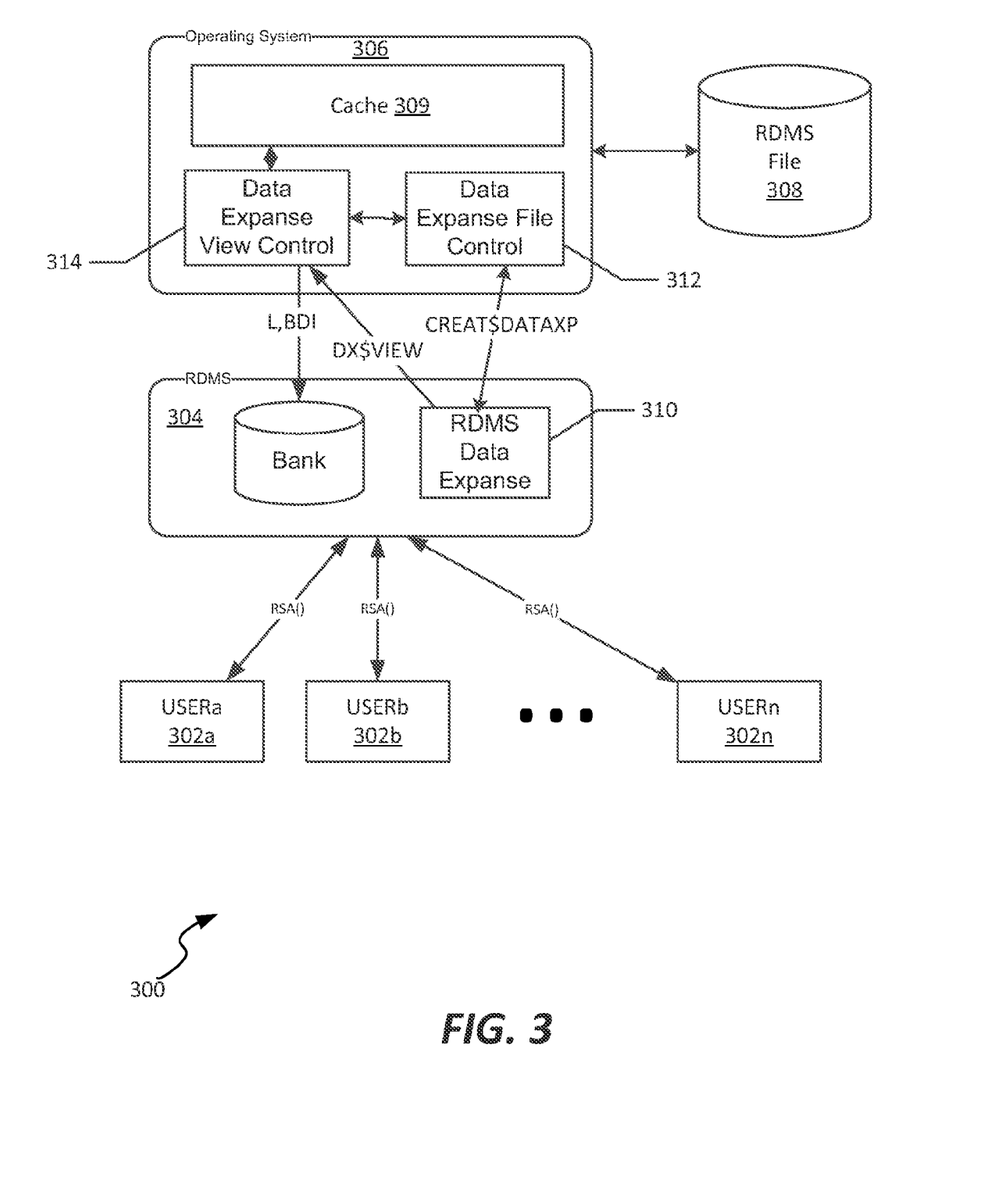
FIG. 3 is a schematic view of a computing system including a database management system and operating system cooperating to provide a data expanse viewer to the database management system, according to a possible embodiment of the present application.

Referring now to FIG. 3, a schematic view of a computing system 300 is shown, a plurality of user applications 302a-n communicatively connect to a database management system 304. The user applications 302a-n can be located, for example, on the same computing device as the database management system 304, or on a different computing device or devices that are communicatively connected thereto. Examples of computing devices useable to execute computing instructions constituting the user applications 302a-n and the database management system 304 are discussed below in connection with FIG. 7.

In the embodiment shown, the database management system 304 is a relational database management system configured to receive and process SQL commands to perform operations on database files. As illustrated herein, the database management system 304 is hosted by an operating system 306, which provides access to one or more database files 308. The database management system 304 can be, for example, a possible embodiment of a database management program 204 of FIG. 1.

The operating system 306 can be any of a variety of operating systems capable of hosting a database management system 304 and which provides access controls to data stored in database files 308 on the computing system. In one example embodiment, the operating system 306 can be the OS2200 operating system, from Unisys Corporation of Blue Bell, Pa. In alternative embodiments, other operating systems could be used as well.

In contrast to the prior arrangement of FIG. 1 in which the database management system 304 is configured to cache a copy of each database file that it has requested, in the embodiment shown the database management system 304 includes a data expanse viewer 310. The data expanse viewer manages access requests for data stored in various data expanses that are managed by the operating system 306. Cooperatively, the operating system includes a data expanse file control component 312 and a data expanse view control component 314. Generally, the data expanse viewer 310 can transmit a request to the operating system 306, in the form of a call to the data expanse file control component 312 to create a data expanse defined by the attributes a database file (shown as the call CREAT$DATAXP). This call tells the operating system 306 to create a cache 309 for the data expanse and initialize all necessary control structures and bit maps to page the cache. Once the data expanse is initialized, the database management system 304 is returned the address call-back into the operating system to access the data expanse. The data expanse file control component 312 can then load a data file 308 into a cache 309 in the operating system, and return to the data expanse viewer a public starting address of the data expanse that is created.

Following creation of the data expanse, the data expanse viewer 310 can be used by any of the user applications 302a-n to access data in the data expanse. For example, each of the user applications can request a different view of the data expanse, defined by a starting address (i.e., an offset from the starting address returned to the data expanse viewer 310, or an absolute address), as well as a size of the view to be created. This can be accomplished, for example as shown, using the operating system call DX$VIEW, providing the starting address and size of the view to be created. The data expanse view control component 314 can then create a view of the data expanse, and provide to the database management system 304 a private address of the view to be created. For example, the address can be an extended virtual mode address, including a length and a bank descriptor index to reference the location of the view.

It is noted that, because the data expanse only is required to be referenced by its starting address or by an address of a particular segment, the data expanse viewer 310 and other portions of the database management system are not required to be capable of addressing the entire range of the data expanse created. Rather, the particular view created within the data expanse is to be fully addressable by the database management system 304. In this way, a database management system, such as system 304, can be made compatible with data files having sizes greater than a maximum addressable range of the database management system. For example, in some embodiments of the present disclosure, the database management system 304 is capable of individually addressing addresses in a bank of 262 k words; in such an arrangement, the database file 308 can have a size in excess of that number, since the address identified by the database management system to the operating system 306 might identify an offset on a bank-by-bank basis, rather than on an individual, word-addressable basis.

Furthermore, using the system 300 as illustrated, a bank is made accessible to the database management system 304 without requiring that the database management system cache each database file; this allows the operating system 306 to maintain cache management, which can be performed more efficiently when managed at the operating system level. Still further, and in contrast to locking a bank (and corresponding database file) to a particular application, the data expanse arrangement of FIG. 3 allows a database file to be individually accessed by many different user applications 302a-n concurrently; instead of requiring such test and set procedures as are present in previous data management systems, by providing a private view into a publicly accessible database file the database management system 304 and operating system 306 alleviate many possible data conflicts.

Figure 4:
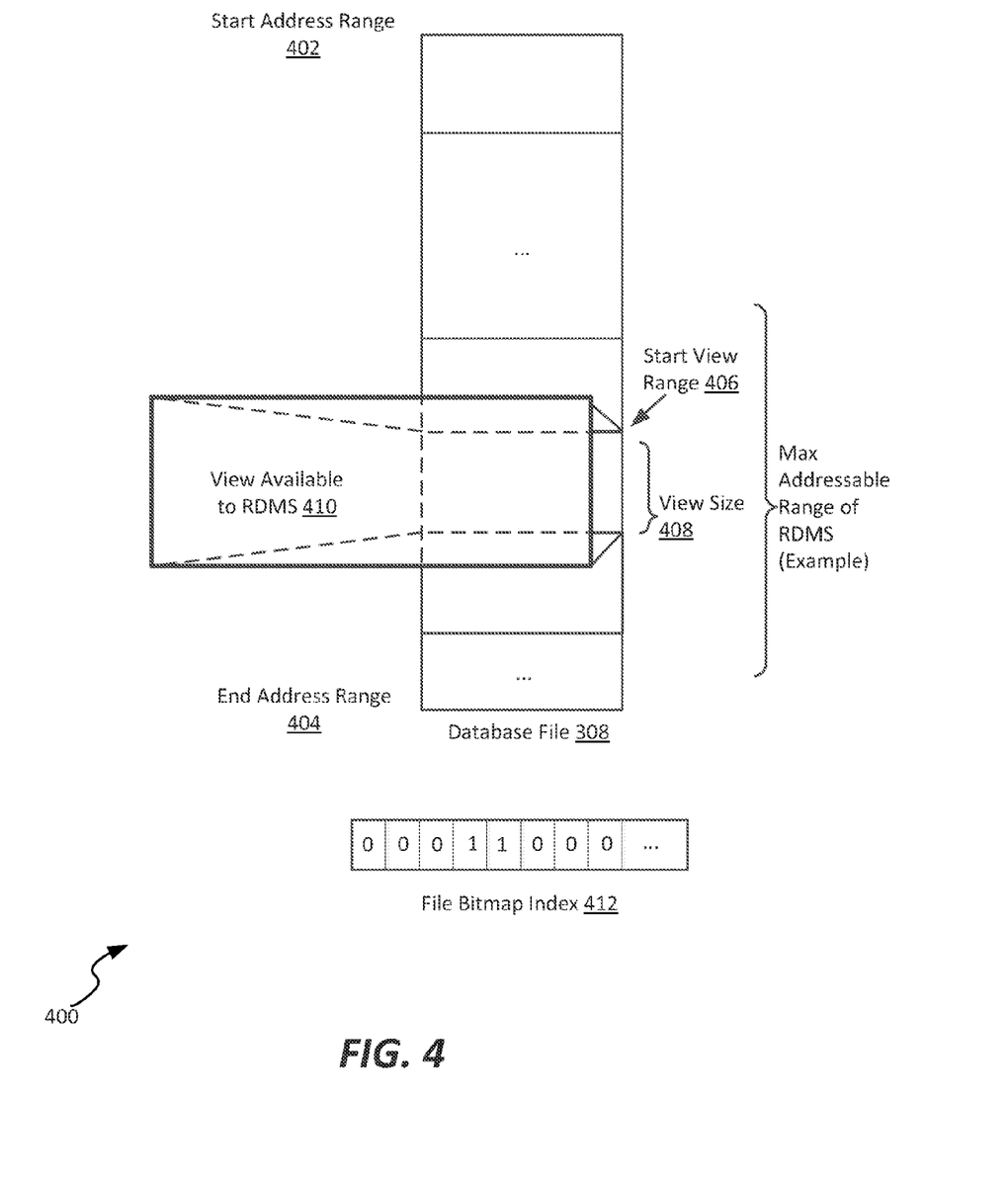
FIG. 4 is a logical diagram of address ranges of a database file using the data expanse viewer of FIG. 3.

Referring to FIG. 4, an example of a possible effect of a data expanse viewer operation within the computing system 300 of FIG. 3 is shown as a logical diagram 400 of address ranges of a database file 308. As illustrated, the database file 308 is loaded from disk into a memory of a computing system and is addressable over a range of addresses, from a start address 402 to an end address 404. Within that range of addresses, a smaller range may exist, which represents an overall word-addressable range of a database management system. Once the start address of the location in memory where the database file is loaded is known (i.e., start address 402), that address is included in the returned data in response to the initial call (e.g., CREAT$DATAXP). This address can be used by the database management system 304 to allow for requests to create one or more views, for example by transmitting from the data expanse viewer 310 a second call (e.g., DX$VIEW) including a particular starting address 406 for the view and its size 408, which results in creation of view 410. It is noted that, as illustrated, the view is not larger than the maximum addressable range of the database management system, and can be located at any address relative to the start address (e.g., a bank descriptor index).

In some embodiments, the logical diagram also includes a bitmap index 412 defining the existing views across the cached database file 308. In particular, when some views are created, the bitmap index 412 can be updated (e.g., by changing from a 0 to a 1) to indicate that the view is present, thereby preventing a second view from being created that overlaps with that view. It is noted that other mechanisms are possible to use as well.

Figure 5:
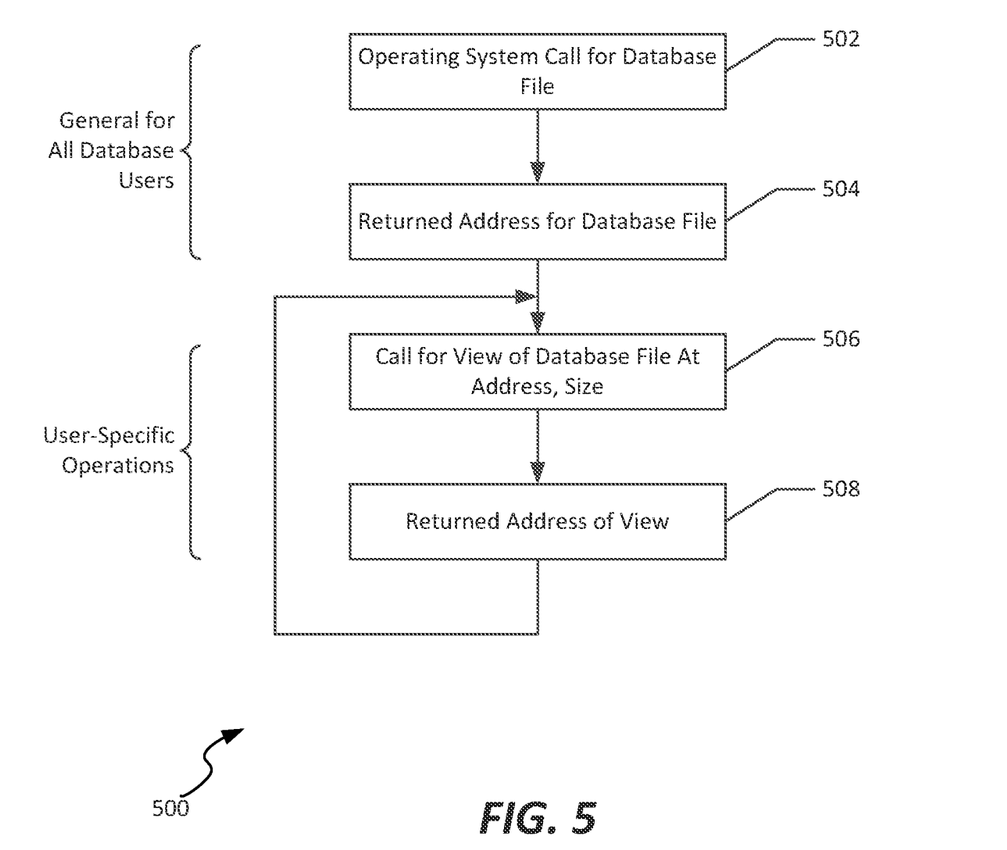
FIG. 5 is a flowchart of an example method of managing access to data for a database management system, according to an example embodiment.

FIG. 5 is a flowchart of an example method 500 of managing access to data for a database management system, according to an example embodiment of the present disclosure. The method 500 can correspond, for example, to operations of one or both of a database management system (e.g., system 304) or an operating system (e.g., operating system 306) in various embodiments.

Generally, the method 500 will be instantiated upon receipt at a database management system of a database command, such as a SQL command or other type of command for a relational or hierarchical database. The database management system will review that command and validate it for errors, as previously described. Assuming the command represents a valid database command, the database management system will issue a call to the operating system to provide access to a database file (step 502). The operating system will receive the call, and load the database file from disk if needed. The operating system will then return to the database management system a gate (i.e., an address) of the database file (step 504). It is noted that the gate returned referencing the database file generally can be considered a general-purpose gate, and as such can be used by the database management system in association with any of a variety of user applications that may be concurrently issuing commands to the database management system.

At this point, the database management system is ready to issue a more specific call for data based on the received database command. Accordingly, the database management system can then issue a further call to the operating system to provide a view of relevant data within the database file (step 506). The operating system will receive that call and create a view as defined in the call, based on a defined address (e.g., an absolute address or an offset from a start of the database file) as well as a size of the view to be created. This can include determining if the view can be created (i.e., if the portion of the data file is available, or if it has been included in a different view owned by another user application). The operating system will then return to the database management system an address, for example in the form of an extended mode virtual address, providing access to the requested view (step 508). In some embodiments, the extended mode virtual address points to a bank created by the operating system. This bank must be based on a base register to access the data. It is noted that this additional call and subsequently returned address can be user application specific, in that multiple user applications cannot have active views of overlapping ranges of data in the database file.

Figure 6:
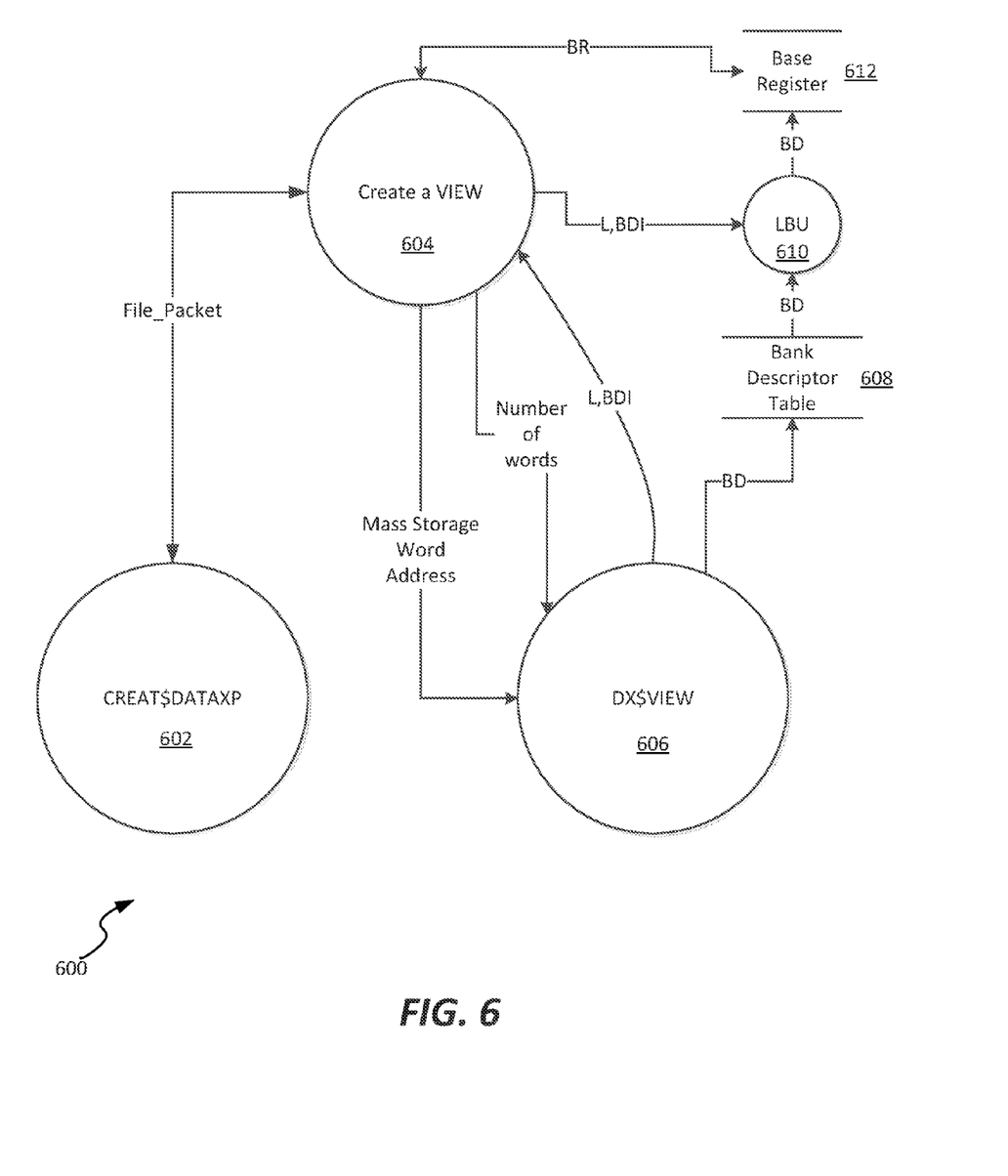
FIG. 6 is a state diagram illustrating operation of the computing system of FIG. 3, according to an example embodiment.

Referring now to FIG. 6, a data flow diagram 600 is depicted which illustrates an example implementation of variables manipulated during the above-described process 500 of FIG. 5, using the computing system as disclosed in FIG. 3. In the data flow diagram 600, an initial view is created by the CREAT$DATAXP call 602. This results in passing a File_Packet parameter to the operating system 306 (from database management system 304) which checks for errors. If there are no errors, the operating system will acquire available memory in which the data expanse is created, and a bank is acquired to hold a bitmap of areas within the data expanse are read. A general DX$VIEW address (i.e., a gate) is returned to the database management system 304. The loaded database file can also result in updated entries in a bank descriptor table 608, used to track locations of files and used memory banks.

Continuing in FIG. 6, a view can be created 604 by calling the returned DX$VIEW gate with a word address and a number of words to view (i.e., the address and size of the view). The word address can be a mass storage relative word address for the view, and the number of words can be limited to the maximum addressable range of the database management system (e.g., 262 k Words, in one example above). Optionally, a bank descriptor index can be passed as well. If there are no errors, a corresponding bank address, in the form of an extended mode virtual address, can be returned. The view can subsequently be accessed by the database management system by basing the bank with an LBU instruction 610, causing the specified base register 612 to be loaded. The database management system can at that point read and/or modify data within the view using the base register as part of an instruction operand.

Figure 7:
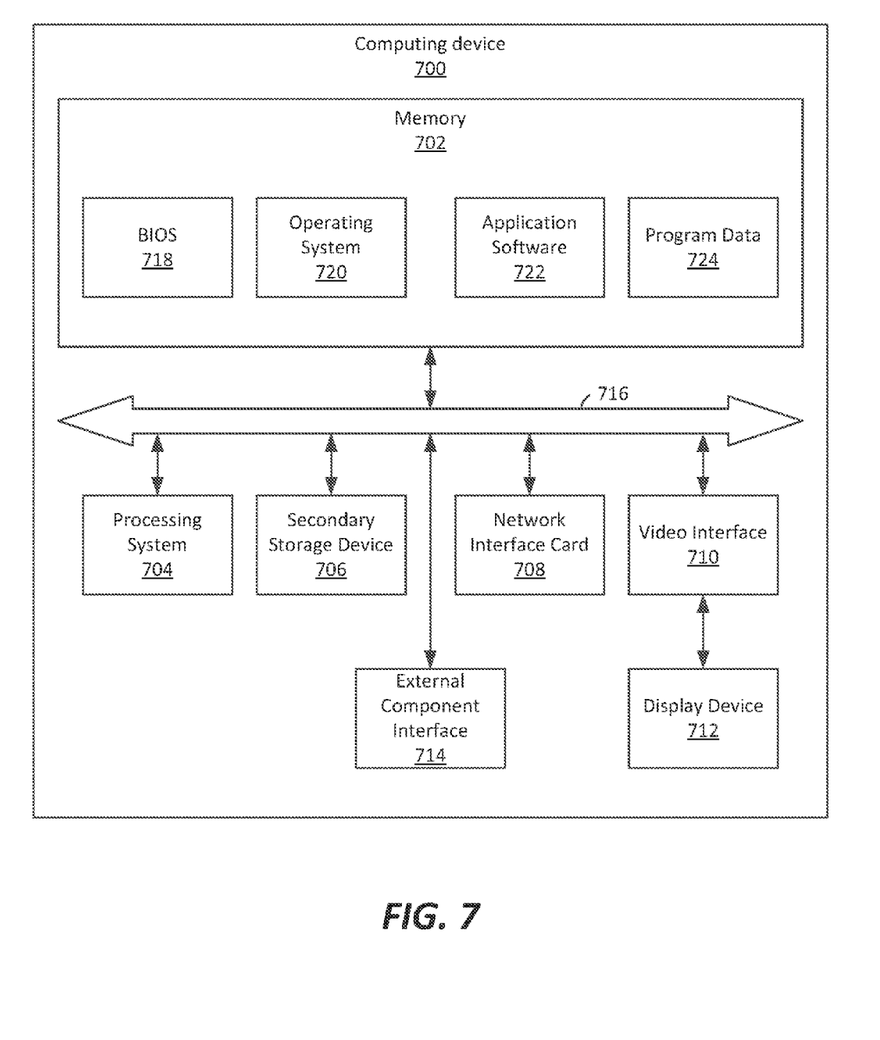
FIG. 7 is a schematic block diagram of an electronic computing device with which aspects of the present disclosure can be implemented.

Referring now to FIG. 7, a block diagram illustrating an example computing device 700 is shown, which can be used to implement aspects of the present disclosure. In particular, the computing device 700 can represent a native computing device, such as a computing system on which any of a variety of the systems of FIGS. 2-6 can be implemented.

In the example of FIG. 7, the computing device 700 includes a memory 702, a processing system 704, a secondary storage device 706, a network interface card 708, a video interface 710, a display unit 712, an external component interface 714, and a communication medium 716. The memory 702 includes one or more computer storage media capable of storing data and/or instructions. In different embodiments, the memory 702 is implemented in different ways. For example, the memory 702 can be implemented using various types of computer storage media.

The processing system 704 includes one or more processing units. A processing unit is a physical device or article of manufacture comprising one or more integrated circuits that selectively execute software instructions. In various embodiments, the processing system 704 is implemented in various ways. For example, the processing system 704 can be implemented as one or more processing cores. In another example, the processing system 704 can include one or more separate microprocessors. In yet another example embodiment, the processing system 704 can include an application-specific integrated circuit (ASIC) that provides specific functionality. In yet another example, the processing system 704 provides specific functionality by using an ASIC and by executing computer-executable instructions.

The secondary storage device 706 includes one or more computer storage media. The secondary storage device 706 stores data and software instructions not directly accessible by the processing system 704. In other words, the processing system 704 performs an I/O operation to retrieve data and/or software instructions from the secondary storage device 706. In various embodiments, the secondary storage device 706 includes various types of computer storage media. For example, the secondary storage device 706 can include one or more magnetic disks, magnetic tape drives, optical discs, solid state memory devices, and/or other types of computer storage media.

The network interface card 708 enables the computing device 700 to send data to and receive data from a communication network. In different embodiments, the network interface card 708 is implemented in different ways. For example, the network interface card 708 can be implemented as an Ethernet interface, a token-ring network interface, a fiber optic network interface, a wireless network interface (e.g., Wi-Fi, WiMax, etc.), or another type of network interface.

The video interface 710 enables the computing device 700 to output video information to the display unit 712. The display unit 712 can be various types of devices for displaying video information, such as a cathode-ray tube display, an LCD display panel, a plasma screen display panel, a touch-sensitive display panel, an LED screen, or a projector. The video interface 710 can communicate with the display unit 712 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 714 enables the computing device 700 to communicate with external devices. For example, the external component interface 714 can be a USB interface, a FireWire interface, a serial port interface, a parallel port interface, a PS/2 interface, and/or another type of interface that enables the computing device 700 to communicate with external devices. In various embodiments, the external component interface 714 enables the computing device 700 to communicate with various external components, such as external storage devices, input devices, speakers, modems, media player docks, other computing devices, scanners, digital cameras, and fingerprint readers.

The communications medium 716 facilitates communication among the hardware components of the computing device 700. In the example of FIG. 7, the communications medium 716 facilitates communication among the memory 702, the processing system 704, the secondary storage device 706, the network interface card 708, the video interface 710, and the external component interface 714. The communications medium 716 can be implemented in various ways. For example, the communications medium 716 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 6, the memory 702 stores a Basic Input/Output System (BIOS) 718 and an operating system 720. The BIOS 718 includes a set of computer-executable instructions that, when executed by the processing system 704, cause the computing device 700 to boot up. The operating system 720 includes a set of computer-executable instructions that, when executed by the processing system 704, cause the computing device 700 to provide an operating system that coordinates the activities and sharing of resources of the computing device 700. Furthermore, the memory 702 stores application software 722. The application software 722 includes computer-executable instructions, that when executed by the processing system 704, cause the computing device 700 to provide one or more applications. The memory 702 also stores program data 724. The program data 724 is data used by programs that execute on the computing device 700.

Although particular features are discussed herein as included within an electronic computing device 700, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data on a tangible medium. As such, computer storage media, as the term is used herein, are not generally constructed exclusively from transitory wired or wireless signals, but rather include some type of tangible storage medium. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Referring to FIGS. 2-7 generally, it is noted that the data expanse viewer described herein can be used, not only in the relational database context as described herein, but in the context of a variety of types of databases incapable of natively accessing data files of sufficient size. The data expanse viewer allows a database management system that can only address less than all of an entire range of a database file to selectively view portions of that file. This allows an operating system to host database files of various sizes, including sizes greater than those supported by addressable ranges of a hosted database management system. Furthermore, the data expanse viewer allows a database management system to avoid being required to cache database files, thereby improving efficiency of operation of the system overall. Other advantages are apparent as well from the present disclosure, and as reflected in the following claims.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of obtaining access to a database file managed by an operating, system in a computing system, the method comprising:
    transmitting a first call to an operating system from a database management system, the first call requesting access to a database file, wherein the database file has a size greater than an address range available to the database management system;
    receiving an address from the operating system at the database management system, the address representing a general address of the database file managed by the operating system;
    transmitting a second call to the operating system from the database management system, the second call including an address and a size of a view of the database file to be created; and
    receiving an address of the view of the database file from the operating system, wherein the address of the view that is received comprises an extended mode virtual address.

2. The method of claim 1, wherein transmitting the first call to an operating system requesting access to a database file occurs in response to receiving a request for data from the database file from an application.

3. The method of claim 1, further comprising performing an operation on data exposed to the database management system within the view of the database file.

4. The method of claim 1, further comprising transmitting a request from the database management system to the operating system.

5. The method of claim 4, wherein the request comprises a request for data in the database file at a location within the view.

6. A method of providing access to a database file by an operating system in a computing system, the method comprising:
    receiving a first call from a database management system, the first call requesting access to a database file, wherein the database file has a size greater than an address range available to the database management system;
    transmitting an address to the database management system, the address representing a general address of the database file managed by the operating system;
    receiving a second call from the database management system, the second call including an address and a size of a view of the database file to be created;
    generating a view of the database file based on the second call, wherein the address of the view that is generated comprises an extended mode virtual address; and
    transmitting an address of the view of the database file from the operating system.

7. The method of claim 6, wherein the database management system and the operating system execute on the same computing system.

8. The method of claim 6, further comprising, upon receiving an indication from the database management system, deleting the view.

9. The method of claim 6, further comprising, upon detecting that the database management system has been exited, deleting the view.

10. A system comprising:
 a computing system including a processor and memory;
 an operating system maintained the memory and configured to manage a file system maintained in the memory, the file system maintaining a database file having a file size;
 a database management system hosted by the operating system, the database management system supporting an address range that is smaller than the file size;
 wherein the operating system is configured to:
  in response to receiving a first call from the database management system requesting access to the database file, transmit a general address of the database file to the database management system; and
  in response to receiving a second call from the database management system requesting a view of the database file, transmit an address of the view of the database file, wherein the address of the view comprises an extended mode virtual address.

11. The system of claim 10, wherein the request for a view of the database file includes an address within the file and a size of the view to be created.

12. The system of claim 10, wherein the call requesting a view of the database file occurs following receipt, at the database management system, of a request for data within the view.

13. The system of claim 11, wherein the request for data within the view is received by the database management system from a client application.

14. The system of claim 12, wherein the client application executes on a second computing system communicatively connected to the computing system.

15. The system of claim 10, wherein the database management system comprises a relational database management system.

16. The system of claim 10, wherein the operating system manages a plurality of views, each of the plurality of views associated with a different request by a different application program communicatively connected to the database management system.

* * * * *